United States Patent
Hamilton, II et al.

(10) Patent No.: US 10,102,534 B2
(45) Date of Patent: Oct. 16, 2018

(54) SYSTEM AND METHOD FOR VIRTUAL UNIVERSE RELOCATION THROUGH AN ADVERTISING OFFER

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2585 days.

(21) Appl. No.: 12/330,697

(22) Filed: Dec. 9, 2008

(65) Prior Publication Data

US 2010/0145797 A1 Jun. 10, 2010

(51) Int. Cl.
*G06Q 30/02* (2012.01)
(52) U.S. Cl.
CPC ......... *G06Q 30/02* (2013.01); *G06Q 30/0251* (2013.01)
(58) Field of Classification Search
CPC ..................................................... G06Q 30/02
USPC ...................................................... 705/14.49
See application file for complete search history.

(56) References Cited

U.S. PATENT DOCUMENTS

| | | | |
|---|---|---|---|
| 6,396,509 B1 * | 5/2002 | Cheng ................. | G06F 3/011 345/419 |
| 7,155,680 B2 * | 12/2006 | Akazawa et al. ............. | 715/757 |
| 2003/0126035 A1 * | 7/2003 | Kake et al. ..................... | 705/26 |
| 2004/0193441 A1 | 9/2004 | Altieri | |
| 2005/0022139 A1 * | 1/2005 | Gettman et al. .............. | 715/850 |
| 2005/0054381 A1 | 3/2005 | Lee et al. | |
| 2006/0026067 A1 * | 2/2006 | Nicholas et al. ................ | 705/14 |
| 2006/0069610 A1 | 3/2006 | Rossini | |
| 2007/0061334 A1 | 3/2007 | Ramer et al. | |
| 2007/0061336 A1 | 3/2007 | Ramer et al. | |
| 2007/0129990 A1 * | 6/2007 | Tzruya .................... | G06F 9/455 705/14.19 |
| 2007/0130010 A1 | 6/2007 | Pokonosky | |
| 2007/0179867 A1 * | 8/2007 | Glazer et al. .................... | 705/27 |
| 2007/0265090 A1 * | 11/2007 | Barsness et al. .............. | 463/42 |
| 2008/0306817 A1 * | 12/2008 | Amidon et al. ................ | 705/14 |
| 2009/0172540 A1 * | 7/2009 | Jung ...................... | A61B 5/744 715/706 |

* cited by examiner

*Primary Examiner* — Daniel M Sorkowitz
(74) *Attorney, Agent, or Firm* — Brian M. Restauro; Andrew M. Calderon; Roberts Mlotkowski Safran Cole & Calderon, P.C.

(57) ABSTRACT

The present invention is directed to a system and method for providing an advertising offer that is configured to relocate an avatar within the virtual environment. The system is configured to ascertain one or more advertisements for display based on at least one of: an inventory analysis of an avatar, a historical teleportation analysis of the avatar, a motion analysis of the avatar, a social network analysis of the avatar, and a ratings analysis of the one or more advertisements within a virtual universe. The system also includes an advertisement display system structured to display the one or more advertisements to the avatar.

20 Claims, 4 Drawing Sheets

FIG. 8

SYSTEM AND METHOD FOR VIRTUAL UNIVERSE RELOCATION THROUGH AN ADVERTISING OFFER

FIELD OF THE INVENTION

The present invention relates to virtual environments and, more specifically, to a system and method for providing an advertising offer capable of relocating an avatar within a virtual environment.

BACKGROUND OF THE INVENTION

A virtual universe (VU) is an interactive simulated environment accessed by multiple users through an online interface. Users inhabit and interact in the VU via avatars, which are two or three-dimensional graphical images that represent the user. Although there are many different types of VUs, there are several features many VUs generally have in common. These features include, for example,

- Shared Space: the VU allows many users to participate at once;
- Graphical User Interface: the VU depicts space visually, ranging in style from 2D "cartoon" imagery to more immersive 3D environments;
- Immediacy: interaction takes place in real time;
- Interactivity: the VU allows users to alter, develop, build, or submit customized content;
- Persistence: the VU's existence continues regardless of whether individual users are logged in; and
- Socialization/Community: the VU allows and encourages the formation of social groups such as teams, guilds, clubs, cliques, housemates, neighborhoods, etc.

An avatar can have a wide range of business and social experiences within a virtual environment. Such business and social experiences are becoming more common and increasingly important in on-line VUs. For example, users may have a business experience by purchasing items within a VU using real or virtual currency. These purchases can range from a beverage to a designer sweater or even a new car for the user's avatar to drive in the VU.

As users begin spending more money on objects within VUs, businesses are faced with increased problems in effectively advertising to virtual users. This is, in part, because businesses are now presented with customers they cannot see nor demographically classify. Accordingly, there exists a need in the art to address the limitations described hereinabove.

SUMMARY OF THE INVENTION

In a first aspect of the invention, a system comprises an advertisement generation service configured to ascertain one or more advertisements for display based on at least one of: an inventory analysis of an avatar, a historical teleportation analysis of the avatar, a motion analysis of the avatar, a social network analysis of the avatar, and a ratings analysis of the one or more advertisements within a virtual universe. The system also comprises an advertisement display system structured to display the one or more advertisements to the avatar.

In another aspect of the invention, the method comprises identifying a location configured to display one or more advertisements; identifying the one or more advertisements to display at the location based on at least one of: an avatar's inventory, the avatar's teleportation history, the avatar's motions, the avatar's social network, and ratings of the one or more advertisements within a virtual universe. The method also comprises displaying the one or more advertisements at the location based on context of the avatar associated with the one or more advertisements.

In another aspect of the invention, a computer program product comprising a computer usable medium having readable program code embodied in the medium is provided. The computer program product includes at least one component to: determine if a location is available to display one or more advertisements; identify which of the one or more advertisements are pertinent to an avatar by analyzing at least one of: the avatar's inventory, teleportation history, motions, social network, and any ratings associated with the one or more advertisements. The computer program product also displays the one or more advertisements to the avatar within a virtual universe.

In another aspect of the invention, a method for deploying an application for generating advertisements, comprises: providing a computer infrastructure being operable to determine one or more advertisements which are pertinent to an avatar by analyzing at least one of the avatar's: inventory to determine a context of at least one item in the avatar's inventory; historical teleportation to determine the context of at least one of the avatar's previous teleportations; motions to determine the context of at least one of the avatar's previous motions; social network to identify members in the avatar's social network; and ratings associated with the one or more advertisements. The computer infrastructure is further operable to display the one or more advertisements to an avatar within a virtual universe.

BRIEF DESCRIPTION OF THE DRAWINGS

The present invention is described in the detailed description which follows, in reference to the noted plurality of drawings by way of non-limiting examples of exemplary embodiments of the present invention.

FIG. 7 illustrates a flow diagram of a Teleportation System in accordance with an embodiment of the present invention.

DETAILED DESCRIPTION OF THE INVENTION

The present invention relates to virtual environments. In particular, the present invention relates to a system and method for providing advertisements to an avatar and remunerating an avatar, VU owner, service provider, etc., for displaying and/or viewing the advertisement. The system and method is also capable of scoring advertisements to determine which advertisements are most pertinent to an avatar. Additionally, the system and method also allows an avatar to select an advertisement, which teleports the avatar from a first location to a second location.

More specifically, the present invention includes an Advertising System that looks for advertising locations within a certain proximity of a user's avatar. If a location is available, and the location is capable of displaying one or more advertisements, then the system and method of the present invention determines which advertisement(s) should be displayed in the location to best target the specific avatar. The targeting of an advertisement is performed by, in embodiments, analyzing an avatar's inventory, teleportation history, movements, social networks, and/or the popularity of advertisements within the VU. Once analyzed, the pertinent advertisements can be displayed to the user while participating in the VU.

In addition to providing targeted advertisements to a user within a VU, the present invention also allows a user to select the displayed advertisement by, e.g., clicking on the advertisement. Once the avatar selects the advertisement, the avatar can be transported to a new location that is related to the advertisement. For example, a user presented with an advertisement for an IBM® server may select the advertisement and be transported to a virtual store where the user can show for, e.g., IBM® servers and other computer hardware. (IBM is a registered trademark of International Business Machines Corporation, in the U.S. and throughout the world.)

The present invention also allows for remuneration obtained from the advertisers to be distributed to those associated with the advertisement, such as the service provider, the user, and/or a VU resident owning a location which is displaying the virtual advertisement. The amount of remuneration and the form in which the remuneration is paid may depend on any number of factors including predetermined agreements between the parties associated with the advertisement.

System Environment

Figure 1:
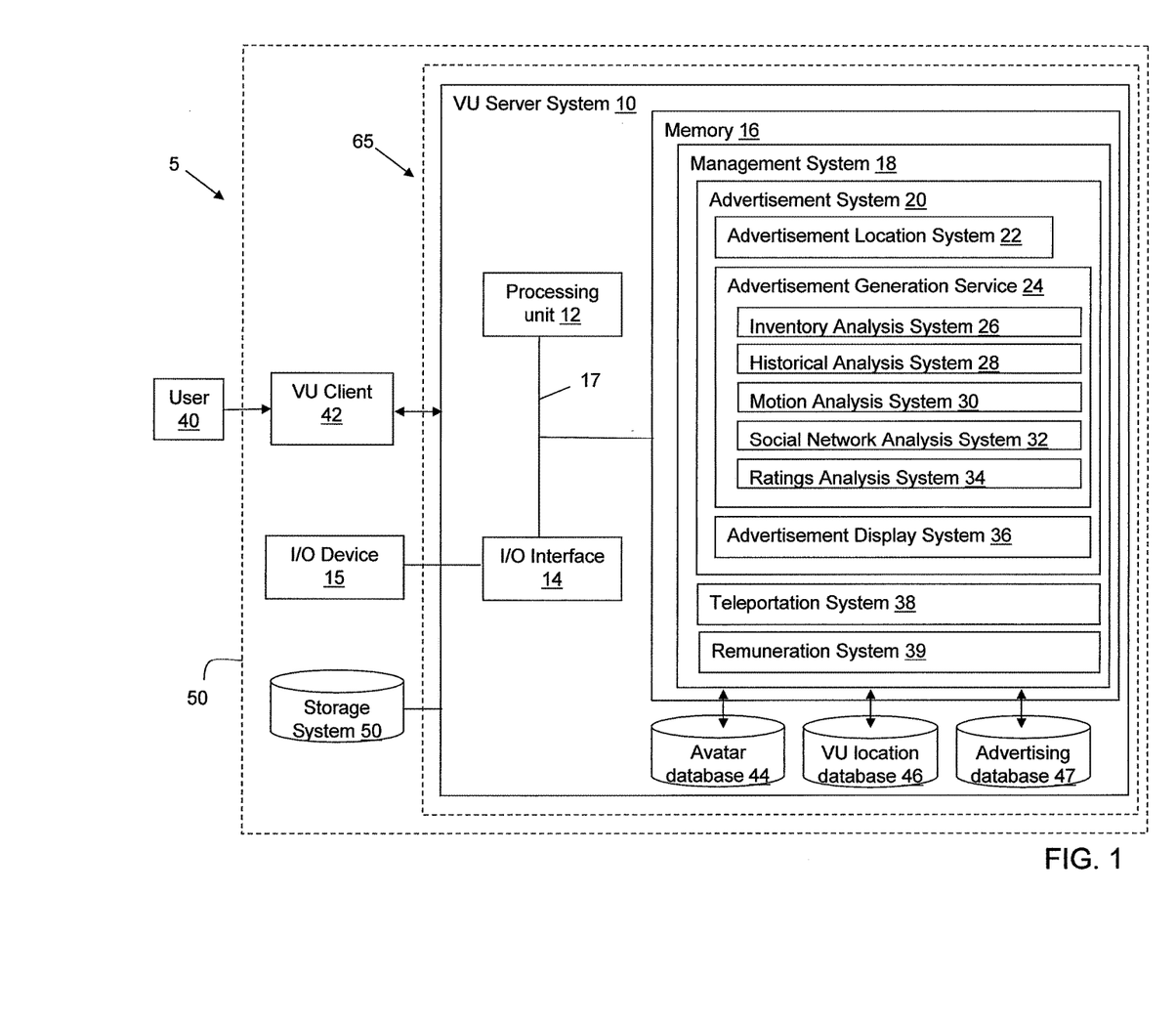
FIG. 1 illustrates a VU infrastructure in accordance with an embodiment of the present invention.

FIG. 1 shows an illustrative environment 5 for managing the processes in accordance with the invention. To this extent, the environment 5 includes a computer infrastructure 50 that can perform the processes described herein. In particular, the computer infrastructure 50 includes a computing device 65, which may be in the form of a VU Server System 10. The computing device 65 comprises a management system 18, which may be embodied as a VU. The management system 18 makes computing device 65 operable to provide advertisements to VU users, e.g., avatars, and, upon request, relocate an avatar to a certain location in the VU in accordance with the invention, e.g., process described herein.

More specifically, the management system 18, which may be embodied as a VU, comprises an Advertisement System 20, a Teleportation System 38, and a Remuneration System 39. The Advertisement System 20 is configured to present advertisements to the avatar controlled by user 40 and may be run and implemented by the management system 18, by a third-party service, or a combination of both. Accordingly, although shown as a single system in FIG. 1, it is understood that some or all of the functions and systems described herein may be distributed among two or more systems.

Generally, the Advertisement System 20 includes: (1) an Advertisement Location System 22; (2) an Advertisement Generation Service 24; and (3) an Advertisement Display System 36. The Advertisement Location System 22 is structured to ascertain locations within the VU that can hold one or more advertisements. The specific criteria used when locating these locations, e.g., size, location, cost, ownership of the location, type of advertisement, etc., may vary between embodiments. Examples of locations include billboards, vending machines, store displays, etc. Once the Advertisement Location System 22 identifies that an advertising location is available, then the Advertisement Location System 22 launches the Advertisement Generation Service 24.

The Advertisement Generation Service 24 may utilize one or more analysis systems 26, 28, 30, 32, 34 to provide any number of advertisements to an avatar within a VU. The analysis systems may include: an Inventory Analysis System 26, a Historical Analysis System 28, a Motion Analysis System 30, a Social Network Analysis System 32, and a Ratings Analysis System 34. Each analysis system 26, 28, 30, 32, 34 is configured to scan information about an avatar and use that information to present at least one pertinent advertisement to the user 40. For example, the Inventory Analysis System 26 is configured to scan an avatar's inventory, the Historical Analysis System 28 is configured to scan an avatars teleportation history, the Motion Analysis System 30 is configured to scan an avatar's actions, the Social Network Analysis System 32 is configured to determine an avatar's interactions with other avatars, and the Ratings Analysis System 34 is configured to determine the most popular advertisements and/or objects within the VU. The Advertisement Generation Service 24 may employ any combination of the analysis systems 26, 28, 30, 32, 34. In those cases where two or more analysis systems 26, 28, 30, 32, 34 are used, the results from each can be combined and/or scored in any manner.

The information used by the analysis systems 26, 28, 30, 32, 34 can be taken from one or more of an avatar database 44, a VU location database 46, and an advertising database 47. These databases 44, 46, 47 can be comprised in the storage system 50 (although shown separately in FIG. 1.) The avatar database 44 may comprise, e.g., inventory information, past teleportation activities, and past motion information. The VU location database 46 may include metadata associated with locations in the VU. For example, the metadata may include information that describes a location such as "beach", "office", "bungalow", etc. The advertising database 47 may include actual advertisements and/or information on prior advertisements such as how frequently the advertisement has been displayed, who has previously seen the advertisement, the successfulness of the advertisement, etc.

Once the advertisements are determined, the Advertisement Display System 36 displays the advertisements to the user 40 via the VU client 42. The Advertisement Display System 36 may be implemented in any fashion to output the advertisement to the user 40. While advertisements generally have at least a partial visual component, it should be understood by those of skill in the art that the advertisements presented to the user 40 may be audio, aromatic, etc. Additionally, it should be understood that two avatars simultaneously encountering the same advertising location may or may not encounter the same advertisement displayed in the location. Therefore, one avatar encountering a billboard may see an advertisement for shoes, another avatar may see and hear an advertisement for a new Information Technology (IT) service, while yet another avatar may not be presented with any advertisement at all. Whether an advertisement is encountered, and the type of advertisement encountered, depends on a variety of factors, such as: the results of the analysis systems 26, 28, 30, 32, 34; user preferences; the proximity of a user 40 to the advertising location; the likelihood a user 40 will see the advertisement; whether an advertisement is available for display; etc.

Once an advertisement is displayed, the user can select the advertisement and be teleported to a new location based on the selected advertisement. This teleportation is performed via the Teleportation System 38, which is configured to relocate an avatar from a first location in the VU to a second location in the VU.

A Remuneration System 39 is also contemplated by the present invention. The Remuneration System 39 is configured to determine which party, or parties, associated with an advertisement are entitled to remuneration. Once determined, the Remuneration System 39 remits a payment to any one or more of the parties via an established payment method. The parties receiving the remuneration may include a service provider, a user 40, and/or an owner of a location in the VU in which the advertisement is displayed. The remuneration may take the form of real currency, virtual currency, barter, credit systems, etc.

The computing device 65 made operable by the management system 18 includes a processing unit 12, a memory 16, an input/output (I/O) interface 14, and a bus 17. The memory 16 can include local memory employed during actual execution of program code, bulk storage, and cache memories which provide temporary storage of at least some program code in order to reduce the number of times code must be retrieved from bulk storage during execution. Further, the computing device 65 is in communication with an external I/O device/resource 15 and a storage system 50. The external I/O device/resource 15 may be keyboards, displays, pointing devices, etc. The external I/O device/resource 15 may be used in conjunction with the Advertisement Display System 36 to display the advertisement.

In general, the processing unit 12 executes computer program code, which is stored in memory 16 and/or a storage system 50. While executing computer program code, the processing unit 12 can read and/or write data to/from memory 16, storage system 50, and/or I/O interface 14. The bus 17 provides a communications link between each of the components in the computing device 65. The I/O device 15 can comprise any device that enables an individual to interact with the computing device 65 or any device that enables the computing device 65 to communicate with one or more other computing devices using any type of communications link.

The computing device 65 can comprise any general purpose computing article of manufacture capable of executing computer program code installed thereon (e.g., a personal computer, server, handheld device, etc.). However, it is understood that the computing device 65 is only representative of various possible equivalent computing devices that may perform the processes described herein, such as a VU Server System 10. To this extent, in embodiments, the functionality provided by computing device 65 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 50 is only illustrative of various types of computer infrastructures for implementing the invention. For example, in embodiments, the computer infrastructure 50 comprises two or more computing devices (e.g., a server cluster) that communicate over any type of communications link, such as a network, a shared memory, or the like, to perform the process described herein. Further, while performing the processes described herein, one or more computing devices in the computer infrastructure 50 can communicate with one or more other computing devices external to computer infrastructure 50 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Systems and Services within the Virtual Universe

FIGS. 2-8 are flow diagrams implementing steps of the invention which may be implemented in the environment of FIG. 1. FIGS. 2-8 may equally represent a high-level block diagram of the invention. The steps of FIGS. 2-8 may be implemented and executed from either a server, in a client server relationship, or they may run on a user workstation (which can be generally represented in FIG. 1) with operative information conveyed to the user workstation to allow teleportation within the VU via an advertising offer. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Advertisement Generation Service

The Advertisement System 20 illustrated in FIG. 1 includes an Advertisement Generation Service 24, which comprises one or more analysis systems. These analysis systems are illustrated in FIGS. 2-6 and may include an Inventory Analysis System 26, a Historical Analysis System 25, a Motion Analysis System 30, a Social Network Analysis System 32, and a Ratings Analysis System 34. Embodiments may provide additional or fewer analysis systems to provide targeted advertisements to avatars within a VU.

Figure 2:
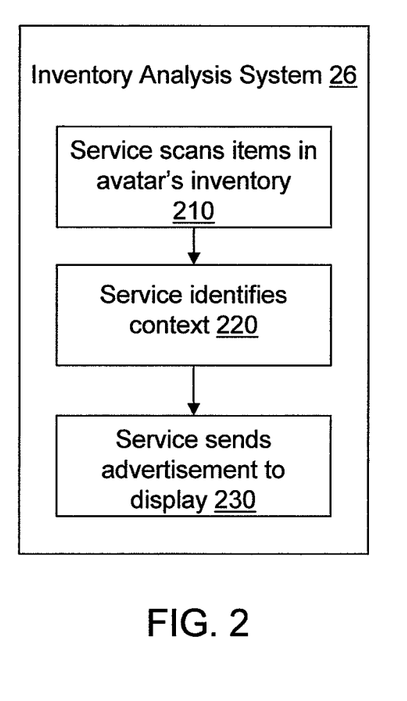
FIG. 2 illustrates a flow diagram of an Inventory Analysis System in accordance with an embodiment of the present invention.

FIG. 2 illustrates an Inventory Analysis System 26 according to an embodiment of the present invention. The Inventory Analysis System 26 is configured to scan an inventory of the user and, in embodiments, use this gathered information to present a pertinent advertisement to the user. For example, in embodiments, the Inventory Analysis System 26 scans public and/or non-public items, e.g., objects, in an avatar's inventory, at step 210. During this scan, the Inventory Analysis System 26 determines at least one context, which may include a set of facts and/or circumstances that surround each inventory item, at step 220. This context may be matched against metadata associated with an advertisement stored in the advertising database. Any matches may then be scored based on closeness of match, relevance, amount of revenue received, etc., in order to determine which advertisements are most likely to be pertinent to the avatar. Once scored, the system can send the advertisement to the Advertisement Display System, at step 230. In this way, the most pertinent advertisements can be displayed to a user based on a user's inventory. The user may then be provided with the opportunity to teleport to one or more locations associated with the advertisement.

In embodiments, using the Inventory Analysis System 26, advertisers can target users that are most likely to be interested in a particular product or service. For example, if a user's avatar has a camera and some photographs in its inventory, the Inventory Analysis System 26 will determine the context "photography" from both items based on their metadata, such as object name or description. Next, the Inventory Analysis System 26 would search the advertising database 47 to find advertisements that have "photography" or variations thereof in their metadata. Once found, the Inventory Analysis System 26 scores the advertisements according to pre-established factors such as: whether the advertisement has ever been displayed to the user; the last time the advertisement was displayed; how closely the advertisement relates to the user's inventory; etc. Embodiments may also consider the location of the user when scoring advertisements so as to avoid providing inaccurate or inappropriate advertisements to the user, e.g., presenting an advertisement for swim wear to a user visiting colder climates or an office building.

Figure 3:
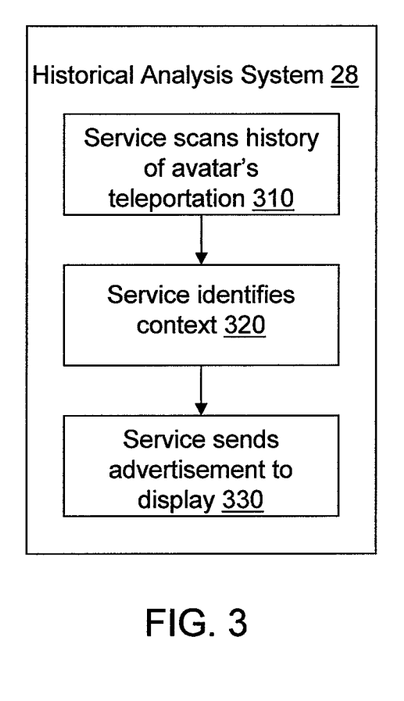
FIG. 3 illustrates a flow diagram of a Historical Analysis System in accordance with an embodiment of the present invention.

FIG. 3 illustrates a Historical Analysis System 28 according to an embodiment of the present invention. The Historical Analysis System 28 is configured to scan the user's teleportation history and, in embodiments, use this gathered information to present an advertisement to the user. More specifically, at step 310, the Historical Analysis System 28 scans an avatar's teleportation history. During this scan, the Historical Analysis System 28 determines at least one context from the avatar's past teleportations, at step 320. This context may include any number of facts and/or circumstances that surround the avatar's past teleportations and may be matched against metadata associated with the advertisement stored in an advertising database. The matches may be scored based on closeness, relevance, amount of revenue received, etc. Once scored, the system sends the advertisement to the Advertisement Display System, at step 330, to be displayed to the user. The user may then be provided with the option to teleport to one or more locations associated with the advertisement.

In embodiments, the Historical Analysis System 28 can scan any number of past teleportations, including, for example, an avatar's complete teleportation history, a specific number of the avatar's most recent teleportations, all of the teleportations occurring within a predetermined period of time, etc. By using this information, advertisers can target a user that is most likely to be interested in the product or services offered by the advertiser. For example, the Historical Analysis System 28 may determine that an avatar has recently teleported to various technical symposiums on the topic of network computing. The Historical Analysis System 28 can obtain contexts "network" and "TCP/IP" and use these contexts to search the advertisement database 47 for advertisements having the words "network" and "TCP/IP" or variations thereof in their metadata descriptions. After the matching advertisements are scored, the advertisement with the highest score may be displayed to the user. Embodiments may also permit multiple advertisements to be displayed at a given advertisement location and/or create a queue of advertisements to avoid repetitious rescoring.

Figure 4:
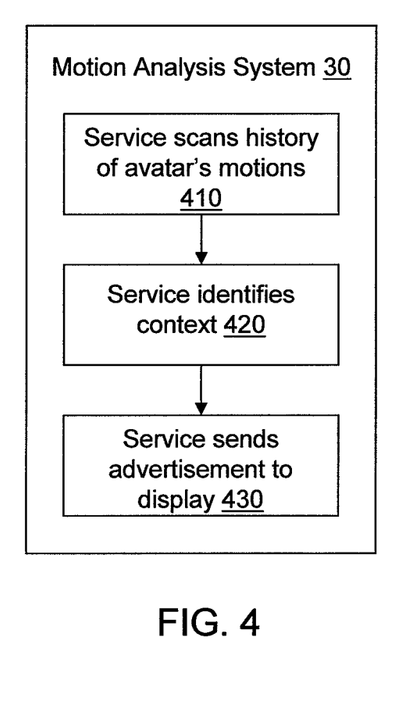
FIG. 4 illustrates a flow diagram of a Motion Analysis System in accordance with an embodiment of the present invention.

FIG. 4 illustrates a Motion Analysis System 30 according to an embodiment of the present invention. The Motion Analysis System 30 is configured to scan the avatar's motions and, in embodiments, use this gathered information to provide an advertisement to the user. More specifically, at step 410, the Motion Analysis System 30 scans an avatar's previous and/or current motions. During this scan, the Motion Analysis System 30 may associate the avatar's motions with a context, e.g., a set of facts or circumstances that surround the avatar's motions, at step 420. This context may be matched against metadata associated with an advertisement. Any matches can then be scored based on closeness of match, relevance, amount of revenue received, etc. Once scored, the system sends the advertisement to the Advertisement Display System at step 430 to be presented to the user. The user may then be provided with the opportunity to teleport to one or more locations associated with the advertisement.

A variety of contexts may be associated with an avatar's motions. For example, if an avatar's motions appear jittery, slow to perform common tasks, repetitively moving back and forth, etc., then the motions may indicate the avatar is new to the VU or to VU interfaces in general. Accordingly, the context "newcomer" may be associated with the avatar and be used to search for advertisements that offer help to newcomers. Other information about the user may be used to refine such determination, such as total logged in time with the VU. These advertisements may include anything from virtual teleportation classes to advertisements that focus on basic objects that most avatars within the VU possess. Once the advertisements are scored, they can be displayed to the user.

Figure 5:
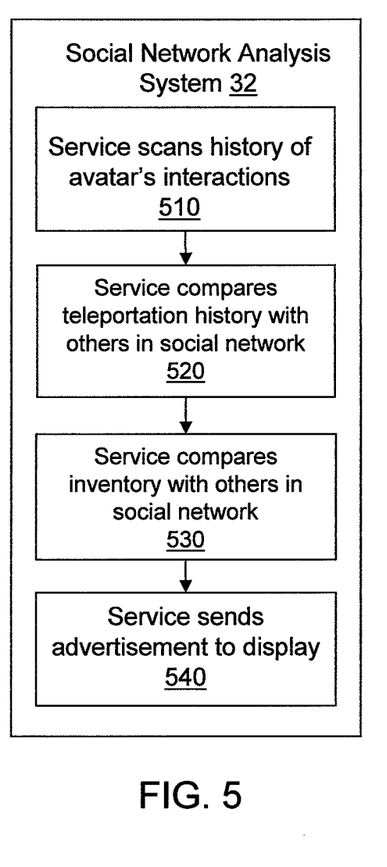
FIG. 5 illustrates a flow diagram of a Social Network Analysis System in accordance with an embodiment of the present invention.

FIG. 5 illustrates a Social Network Analysis System 32 in accordance with aspects of the present invention. The Social Network Analysis System 32 is configured to determine interaction of the avatar with other avatars. This gathered information can then be used to present a pertinent advertisement to a user. More specifically, at step 510, the Social Network Analysis System 32 scans an avatar's interactions to determine which other avatars are within the avatar's social network. Once scanned, the Social Network Analysis System 32 compares the requesting avatar's inventory with the inventory of the members in the social network, at step 520.

Additionally, the Social Network Analysis System 32 may compare the avatar's teleportation history with the teleportation history of the members of the social network, at step 530. This allows the Social Network Analysis System 32 to determine which avatars in the social network are the closest match to the avatar. While the described embodiment compares the avatar's inventory with members of the social network before comparing the avatar's teleportation history with members of the social network, it should be understood to those skilled in the art that an avatar's teleportation history can be compared with members of the social network before a comparison of an avatar's inventory is performed. Additionally, those skilled in the art should recognize that any number of analysis systems can be utilized as part of the Social Network Analysis System 32.

Based on this information, the Social Network Analysis System 32 can determine which advertisements have worked well on those in the avatar's social network, score them, and send them to be displayed to the avatar, at step 540. Embodiments may also utilize the Social Network Analysis System 32 when an avatar has very little inventory, teleportation history, etc., so as to obtain context from those in the avatar's social network. This context may include a set of facts and/or circumstances that surround the avatar.

A number of methods may be used to determine the social network of the requesting avatar. For example, a social network may be comprised of those avatars that have communicated with each other for more than a certain time, e.g., 5 minutes, over a certain period, e.g., the past 30 days. Alternatively, a social network may be based on an avatar's buddy list, the avatar's participation in a club and/or association, etc.

At step 520, the inventory of each avatar within the social network can then be analyzed to find the closest matching set of avatars. At step 530, the teleportation history of the closest matching set of avatars can then be used to further narrow the set of avatars.

Once a set of avatars has been obtained for the social network, an analysis of advertisements that have been found to be most successfully received by members in the social network can be performed and the resulting advertisements scored. The advertisements may be scored on closeness of match, relevance, amount of revenue received, etc., in order to determine which advertisements are most likely to be pertinent to the avatar. Once scored, specific advertisements can be displayed to the user and the user may then be provided with the opportunity to teleport to one or more locations associated with the advertisements.

Figure 6:
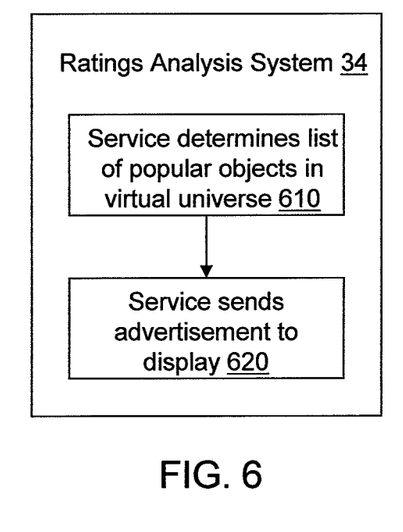
FIG. 6 illustrates a flow diagram of a Ratings Analysis System in accordance with an embodiment of the present invention.

FIG. 6 illustrates a Ratings Analysis System 34 according to aspects of the present invention. The Ratings Analysis System 34 is configured to determine the most popular advertisements and/or objects within the VU and, in embodiments, display such advertisements to the user. More specifically, at step 610, the Ratings Analysis System 34 determines the most popular objects or advertisements within a VU. The popularity of an object may depend on the number of objects in the VU, the number of avatars possessing the object, how many objects have been recently sold, the location of the object being sold, etc. The popularity of an advertisement, which may be associated with a type of object, can depend on a number of different factors such as, for example, the number of times the advertisement has been selected, the average length of time avatars watch and/or listen to the advertisement, etc. Once the most popular objects and/or advertisements are determined, they are scored and then sent to be displayed to the user, at step 620. The user may then be provided with the opportunity to teleport to one or more locations associated with the advertisement.

While a number of analysis systems have been described, it should be understood to one skilled in the art that additional analysis systems may also be used to provide targeted advertisements to avatar's while in a VU. Additionally, while the analysis systems have been discussed independently, any combination of the analysis systems can be used to provide advertisements to an avatar. In those embodiments using two or more analysis systems, the results from the analysis systems can be combined and/or scored in any manner.

Any number of analysis systems may be run each time a user approaches an advertising location. Optionally, instead of continually rerunning the analysis systems when an advertisement is encountered, embodiments may create a queue of advertisements to be displayed when a user's avatar approaches an advertising location. Using a queue, or queue like structure, requires fewer computing resources to be used when determining which advertisements to display.

In embodiments, the analysis systems may also consider whether an advertisement will actually be seen by an avatar before running the analysis systems and/or displaying advertisements. For example, if an avatar is running past a billboard at a considerable speed, then the avatar is very unlikely to see the advertisement on the billboard. In this kind of situation an advertisement may not be needed. Additionally, in another example where there is a considerable virtual distance between the advertisement and the avatar, e.g., the advertisement is too remote to be viewed by the avatar, there may be no need to display the advertisement.

Further embodiments may allow a user to select a viewing mode, which is related to how many advertisements, and/or what kind of advertisements, will be displayed to the user while in the VU. In such instances, the user's viewing mode may be a factor in selecting and/or scoring advertisements to be displayed to the user. For example, if a user only allows a minimum number of advertisements to be displayed, then pertinent high paying advertisements may be displayed before lower paying advertisements.

Teleportation System

FIG. 7 illustrates a Teleportation System 38 according to aspects of the present invention. The Teleportation System 38 is configured to teleport a user's avatar from a first location to a second location when a user selects an advertisement. More specifically, once an advertisement is displayed to a user, the user is able to select the advertisement, e.g., by clicking on the advertisement, at step 710. If the user selects the advertisement, then the user's avatar is teleported to another location, at step 720. The teleportation can be to, e.g., an advertiser's virtual store, a seminar concerning the advertised product or service, etc. Once at the new location, the user may choose to purchase the advertised product and/or service, and/or another product offered by the advertiser. For example, a user may be teleported to a clothing store and decide to purchase a sweater to wear in the VU. The actual purchase may be done using any number of payment methods such as real currency, virtual currency, barter, credit systems, etc.

Remuneration System

Figure 8:
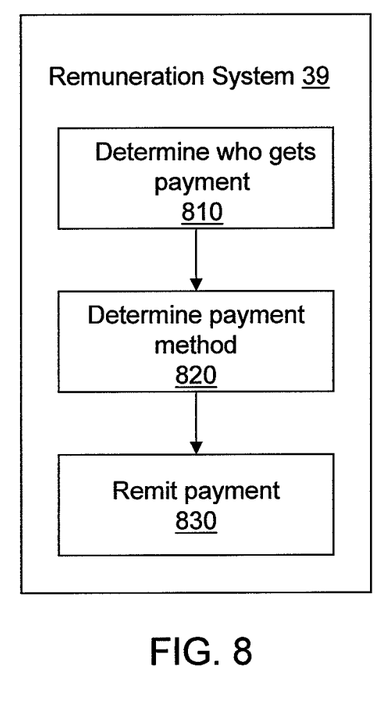
FIG. 8 illustrates a flow diagram of a Remuneration System in accordance with an embodiment of the present invention.

FIG. 8 illustrates a Remuneration System 39 that is contemplated by embodiments of the present invention. In embodiments, the source of the remuneration is provided by advertising offers and/or advertisements within the VU. The amount of the remuneration may vary depending on whether the advertisement was selected, how long the avatar looked at or listened to the advertisement, how many advertisements were presented at the location, the predominance of the advertisement, etc.

In embodiments, the Remuneration System 39 determines what entities should receive remuneration and how much remuneration each entity should receive, at step 810. The remuneration may be given to a service provider, avatar, and/or a VU resident owning a location which is displaying the virtual advertisement, to name but a few different entities. The amount each entity receives may be pre-established between the entities. For example, an avatar that merely looks at an advertisement may not receive any remuneration, however, an avatar that selects the advertisement and/or purchases an object as a result of the advertisement may receive a set amount of remuneration or a certain percentage of the remuneration.

After a determination is made as to which entity will receive the remuneration, a determination is made as to how the remuneration should be rendered, at step 820. The remuneration method may or may not vary depending on the entity receiving the remuneration. For example, if an avatar is receiving the remuneration then the avatar may be paid in real currency, virtual currency, or a discount on the advertised object or another object offered by the advertiser. Additionally, the remuneration can also be in the form of a reduction in subscription fees. The remunerations directed to the owner of the location used to display the advertisement may be remunerated using similar methods. Further, remuneration methods available to service providers and other entities may be in the form of real currency, free or reduced products, barter, as well as any number of other available payment schemes. Once the method of remuneration is decided, the remuneration is remitted to the entity, at step 830.

Additional Embodiments

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims. Additionally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. An advertisement system comprising:
   an advertisement generation service configured to ascertain one or more advertisements for display at a first location within a virtual universe based on an inventory analysis of an avatar, a historical teleportation analysis of an avatar regarding previous teleportations of the avatar to different locations within the virtual universe, a motion analysis of the avatar, a social network analysis of the avatar, and a ratings analysis of the one or more advertisements within a virtual universe;
   an advertisement display system structured to display the one or more advertisements to the avatar at the first location; and
   a teleportation system configured to teleport the avatar from the first location to a second location within the virtual universe associated with the one or more displayed advertisements in response to an action from the avatar,
   wherein at least the advertisement generation service is executed by a processor,
   wherein the social network analysis includes comparing the avatar's inventory and teleportation history with inventories and teleportation histories of other avatars in the avatar's social network, and
   wherein the social network is comprised of other avatars that have communicated with the avatar more than a certain time over a certain time period.

2. The advertisement system of claim 1, wherein the historical teleportation analysis of the avatar is provided by a historical teleportation system, which determines a context of at least one previous teleportation of the avatar, and matches the context to metadata associated with the one or more advertisements.

3. The advertisement system of claim 1, further comprising an advertisement location system configured to identify locations capable of displaying at least one of the one or more advertisements.

4. The advertisement system of claim 1, wherein the action is the avatar selecting the one or more advertisements.

5. The advertisement system of claim 1, wherein remuneration is provided to one or more entities associated with the one or more advertisements.

6. The advertisement system of claim 5, wherein the entities include at least one of the avatar, a service provider, and an owner of a location displaying the one or more advertisements.

7. The advertisement system of claim 5, wherein the remuneration is any one or more of: real currency, virtual currency, barter, discounted products and/or services, and reduction in subscription fees incurred by the avatar or location owner.

8. A method implemented on a computer infrastructure for advertising within a virtual universe comprising:
   identifying a first location within the virtual universe configured to display one or more advertisements;
   identifying the one or more advertisements to display at the location based on an inventory analysis of an avatar, the avatar's teleportation history regarding previous teleportations of the avatar to different locations within the virtual universe, a motion analysis of the avatar, a social network analysis of the avatar, and a ratings analysis of the one or more advertisements within a virtual universe; and
   displaying the one or more advertisements at the first location based on context of the avatar associated with the one or more advertisements; and
   teleporting the avatar from the first location to a second location within the virtual universe associated with the one or more advertisements when the avatar selects at least one of the one or more advertisement,
   wherein the social network analysis includes comparing the avatar's inventory and teleportation history with inventories and teleportation histories of other avatars in the avatar's social network, and
   wherein the social network is comprised of other avatars that have communicated with the avatar more than a certain time over a certain period.

9. The method of claim 8, further comprising remitting remuneration to one or more entities associated with the one or more advertisements.

10. The method of claim 8, wherein the identifying the one or more advertisements further comprises scoring the one or more advertisements to determine which of the one or more advertisements are most pertinent to the avatar.

11. The method of claim 9, wherein the remuneration is provided when the avatar selects at least one of the one or more advertisements.

12. The method of claim 9, wherein the one or more entities include at least one of an avatar, a service provider, and an owner of the location where the one or more advertisements are displayed.

13. The method of claim 8, wherein the steps of claim 8 are provided on a computing infrastructure, which is at least one of supported, deployed, and created by a service provider.

14. A computer program product comprising a tangible computer usable storage medium having readable program code embodied in the tangible storage medium, the computer program product includes at least one component to:
   determine if a first location is available in a virtual universe to display one or more advertisements;
   identify which of the one or more advertisements are pertinent to an avatar by analyzing the avatar's inventory, teleportation history regarding previous teleportations of the avatar to different locations within the virtual universe, motions and social network, and any ratings associated with the one or more advertisements;
   display the one or more advertisements to the avatar at the first location within the virtual universe; and
   teleport the avatar from the first location to a second location within the virtual universe associated with the one or more advertisements when the at least one of the one or more advertisements is selected by the avatar,
   wherein the social network analysis includes comparing the avatar's inventory and teleportation history with inventories and teleportation histories of other avatars in the avatar's social network, and
   wherein the social network is comprised of other avatars within the virtual universe that have communicated with the avatar more than a certain time over a certain period.

15. The computer program product of claim 14, wherein the steps of claim 14 are provided on a computing infrastructure, which is at least one of supported, deployed, and created by a service provider.

16. A method for deploying an application for advertising, comprising computer implemented steps of:
   determining one or more advertisements which are pertinent to an avatar by analyzing the avatar's: inventory to determine a context of at least one item in the avatar's inventory; historical teleportation to determine the context of at least one of the avatar's previous teleportations to different locations within virtual universe; motions to determine the context of at least one of the avatar's previous motions; and social network to identify members in the avatar's social network;
   displaying the one or more advertisements to an avatar at a first location within the virtual universe; and
   teleporting the avatar from the first location to a second location within the virtual universe associated with the one or more advertisements when the at least one of the one or more advertisements is selected by the avatar,
   wherein the social network analysis includes comparing the avatar's inventory and teleportation history with inventories and teleportation histories of other avatars in the avatar's social network, and
   wherein the social network is comprised of other avatars within the virtual universe that have communicated with the avatar more than a certain time over a certain period.

17. The method of claim 16, further comprising remitting remuneration to at least one of the avatar, a service provider, and an entity owning the location at which the one or more advertisements is displayed.

18. The method of claim 16, further comprising teleporting the avatar to the second location upon selecting at least one of the one or more advertisements.

19. The method of claim 1, wherein the advertisement generation service is configured to ascertain the one or more advertisements for display based on the historical teleportation analysis of the avatar.

20. The method of claim 1, wherein the advertisement generation service is configured to ascertain the one or more advertisements for display based on the inventory analysis of the avatar, and the advertisement generation service determines a location of a user of the avatar when ascertaining the one or more advertisements for display such that the advertisement generation service avoids displaying an advertisement that is inappropriate or inaccurate for the location of the user.

* * * * *